Dec. 3, 1968  C. G. PRESSLEY  3,413,692
FASTENER HAVING PREDETERMINED LOAD RELEASE
Filed April 5, 1967                                   2 Sheets-Sheet 1
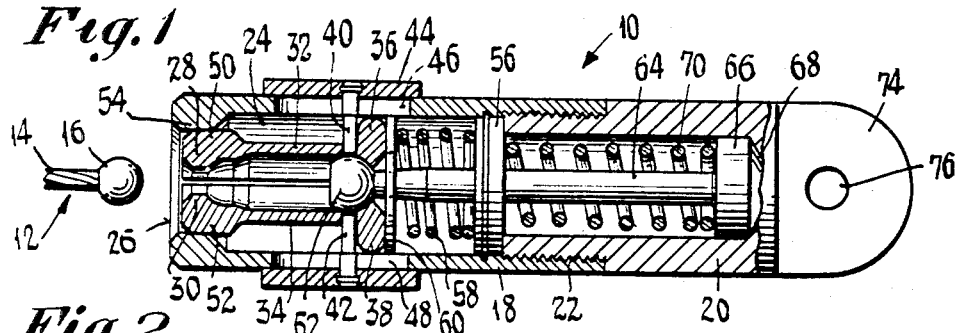
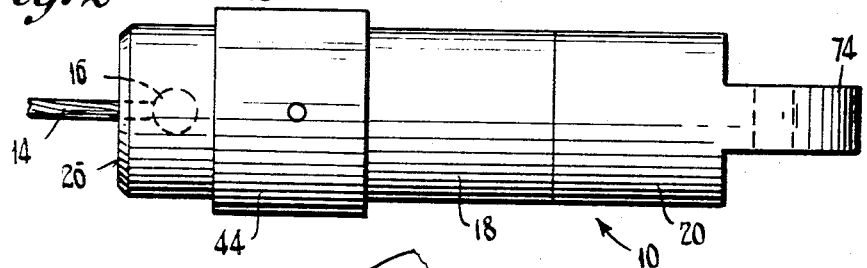
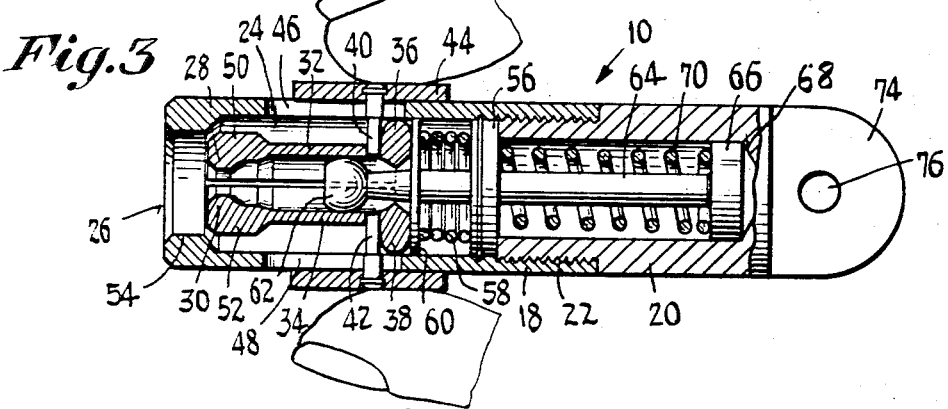
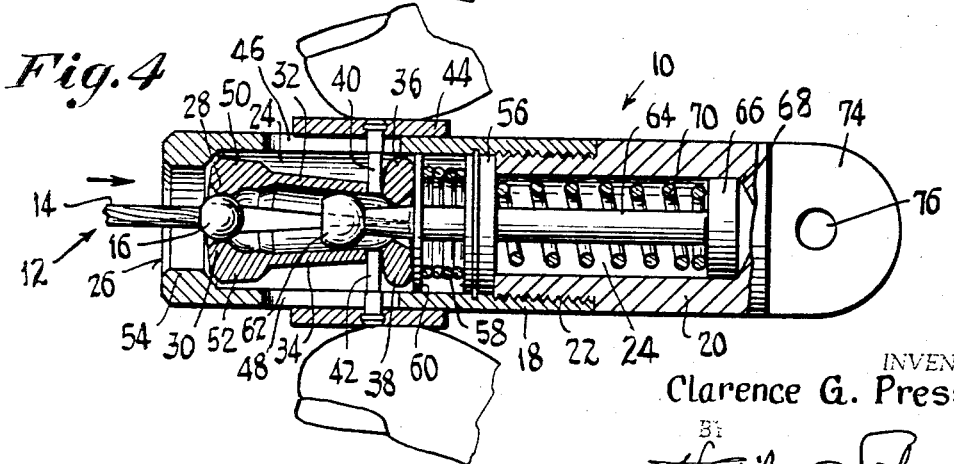
INVENTOR.
Clarence G. Pressley
BY
H. Gilbert Lehmann
AGENT Dec. 3, 1968  C. G. PRESSLEY  3,413,692
FASTENER HAVING PREDETERMINED LOAD RELEASE
Filed April 3, 1967  2 Sheets-Sheet 2

INVENTOR.
Clarence G. Pressley
BY
AGENT

United States Patent Office 3,413,692
Patented Dec. 3, 1968

3,413,692
FASTENER HAVING PREDETERMINED LOAD RELEASE
Clarence G. Pressley, Trumbull, Conn., assignor to Norco, Inc., Ridgefield, Conn., a corporation of Connecticut
Filed Apr. 3, 1967, Ser. No. 627,776
13 Claims. (Cl. 24—230)

ABSTRACT OF THE DISCLOSURE

A fastener for a cable end or the like, wherein an intentional predetermined overpull or tension results in the cable being released. The fastener has an elongate body with an end opening into which the cable is pushed. Chuck-type jaws in the body can grip an enlargement on the cable end, when the jaws are at a given intermediate axial locking position. The jaws are axially movable against the restraint of a spring to an advanced releasing position wherein they can spread. Sufficient pull on the cable overcomes the restraining spring and axially advances the jaws, thereby to release the cable. The jaws are also axially movable against the action of another spring, to a retracted position, also wherein they can spread to receive the enlargement of the inserted cable end. A grippable sleeve on the body is shiftable to axially retract the jaws for receiving the enlargement.

Cross references (1) U.S. Patent No. 2,305,234, (2) U.S. Patent No. 2,440,012, (3) U.S. Patent No. 2,556,117, (4) copending application Ser. No. 454,580 filed May 10, 1965, now Patent No. 3,332,117 in the name of John J. McCarthy, entitled "Releasable Cable Fastener," having common ownership with the present invention and application.

Background

This invention relates to fasteners for receiving and securing end portions of a cable, rod or the like, and more particularly to fasteners of this type wherein release of the cable or rod can be effected as a consequence of an intentional predetermined excess pull or overpull exerted on the cable.

Prior chucking-type fasteners for cable ends or the like, either do not release in response to a measurable or predetermined overpull on the cable, or else if they do respond to overpulls by releasing, are not sufficiently smooth-acting and uniform as concerns the releasing function to be regarded as reliable equipment which will unfailingly let go of the cable, rod or like member under trying or adverse conditions of use and environment.

Summary

The above disadvantages and drawbacks of prior fasteners are obviated by the present invention, and one object of the invention is to provide an improved overpull release type fastener for cable ends and the like, which quickly and unfailingly releases the cable end once the excess pull has initiated the release action.

Other objects are to provide an improved overpull-release type fastener as above, which involves straightforward and direct-acting mechanical movements and principles in its operation, of the kind that are devoid of complications which could cause malfunctioning; to provide a fastener as characterized, which is adaptable to a wide variety of uses, has relatively few parts, is of simple and economical construction, and is small and compact; to provide a fastener as above, wherein the operation is easily and quickly understood and carried out; and to provide a fastener of the kind indicated, wherein most of the parts are wholly contained and concealed whereby the fastener presents a neat, closed and finished appearance.

Other features and advantages will hereafter appear.

In the drawings:

FIGURE 1 is an axial sectional view of a fastener body part as provided by the invention, shown in the locking condition.

FIG. 2 is a top plan view of the fastener of FIG. 1.

FIG. 3 is a view like that of FIG. 1 but showing the body part being actuated to ready it for receiving a cable end.

FIG. 4 is a view like that of FIG. 3 but showing a further step in the process of attachment of a cable end to the fastener. An enlargement on the cable end is being pushed into the chuck and is spreading apart the chuck jaws.

Figure 5:
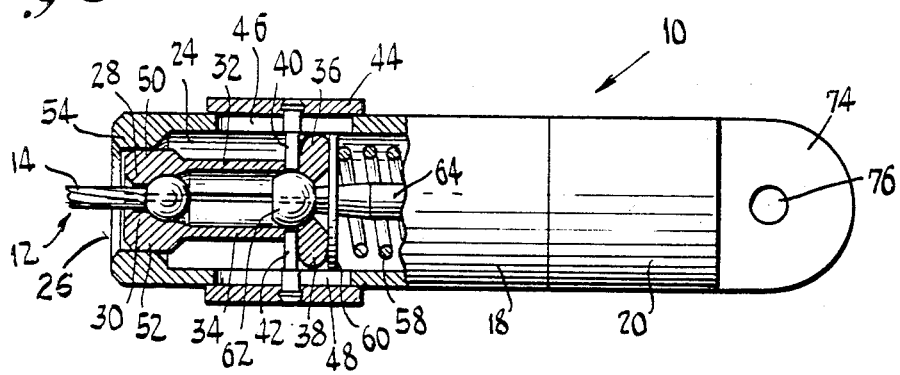
FIG. 5 is a view partly in side elevation and partly in section, showing the cable end fully gripped and secured by the fastener.

Considering first FIG. 1, the present separable fastener as shown therein comprises a main or major part 10 which is adapted to releasably grip a cooperable, minor part 12 which latter is illustrated as being constituted of an end portion 14 of a flexible cable, having secured to it an enlargement in the form of a ball 16. The main part 10 is adapted to receive and releasably grip the enlargement 16, and comprises an elongate tubular two-piece body 18, 20 the pieces of which are secured together in end-to-end relation by cooperable screw threads 22. The body 18, 20 has an axial bore 24 which opens at one end 26 of the body piece 18.

Figure 6:
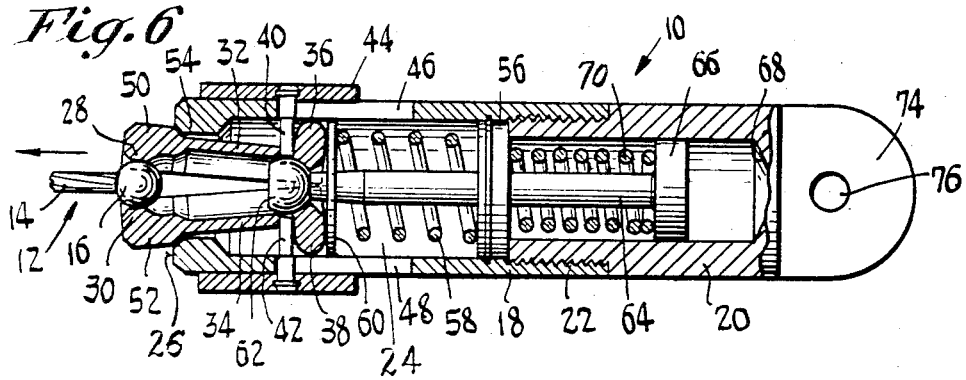
FIG. 6 is an axial sectional view showing the cable end being released in response to its experiencing an excess pull or overpull.

Within the piece 18 and in the bore 24 there is a pair of opposed jaws 28, 30 which in accordance with the present invention, are movably axially in opposite directions from an intermidiate, given position as illustrated in FIG. 1 to either a retracted position illustrated in FIG. 3 or else an advanced position illustrated in FIG. 6.

The jaws 28, 30 have shank portions 32, 34 respectively, terminating at their inner ends in semi-circular flange formations 36, 38 engaging the walls of the bore 24. The flange formations 36, 38 constitute fulcrums about which the jaws 28, 30 can rock in moving to their open positions which are illustrated in FIGS. 4 and 6.

The jaws 28, 30 are coupled for simultaneous axial movement by a pair of pins 40, 42 which are carried by a collar 44 slidable longitudinally on the exterior of the body piece 18. The pins 40, 42 extend inwardly from the collar, through slots 46, 48 respectively in the piece 18, and are loosely accommodated in suitable holes or sockets provided in the shank portions 32, 34 of the jaws.

In moving from the open advanced position of FIG. 6 or the open retracted position of FIG. 4 to the intermediate given closed position of FIG. 1, the jaws 28, 30 are cammed inward by integral projections 50, 52 disposed at the backs of the jaws, said projections being cooperable with an inward projection 54 at the mouth 26 of the body piece 18, in the form of an annular internal shoulder. The projections 50, 52 and the shoulder 54 have sloping or bevelled edges to provide the desired camming action, as will be understood.

In accordance with the present invention, the jaws 28, 30 are axially movable from the intermediate given position illustrated in FIG. 1, to either the retracted open position shown in FIG. 4 or else the advanced open position illustrated in FIG. 6, under the restriction of opposed springs and a one-way driving connection, as will be shortly brought out. In both such shifted positions the jaws may be separated or shifted radially away from each other to either receive the ball enlargement 16 of the cable 14 or else to release the enlargement, as the case may be. In FIG. 4, the jaws are shown as receiving the enlargement 16, whereas in FIG. 6 the jaws are shown as releasing the enlargement 16.

The projections 50, 52 and the annular internal shoulder 54 constitute a means for maintaining the jaws 28, 30 closed at the given position illustrated in FIG. 1. A spring-containing advancement means is provided for biasing the jaws to shift the same from the retracted open position illustrated in FIGS. 3 and 4 to the given, intermediate position of FIG. 1, said advancement means comprising an annular abutment or shoulder 56 fixedly secured in the body piece 18, and comprising a helical compression spring 58 engaged with said shoulder and with a flat washer 60 which in turn engages the flange formations 36, 38 of the jaws 28, 30.

The spring 58 thus tends to shift the jaws 28, 30 axially from right to left as viewed in FIGS. 3 and 4 wherein the spring is shown as being compressed. A stop is provided for terminating the movement of the jaws as effected by the spring 58, said stop comprising a ball-shaped shoulder 62 on a linkage bar 64 which latter extends through the washer 60 and through the abutment shoulder 56 and which carries a head 66 engaged with the bottom wall 68 of the bore 24. A strong helical compression spring 70 engages the head 66 and also the abutment or shoulder 56, thereby to normally maintain the linkage bar 64 in the locking position illustrated in FIG. 1 whereby the bar and the shoulder 62 thereof yieldably maintain the jaws 28, 30 in the intermediate locking position of FIG. 1. The shoulder 62 of the linkage bar 64 engages inner shoulder surfaces of the semi-circular flange formations 36, 38 of the jaws as shown in the various figures, while still permitting a limited rocking or pivotal movement of the jaws between the open and closed positions illustrated; the formations 36, 38 by their engagement with the walls of the bore 24 cannot spread apart radially as urged by the ball shoulder 62.

The compression spring 70 is more powerful than the compression spring 58 whereby it overcomes the force of the latter to maintain the head 66 in engagement with the end wall 68 of the bore so that the ball enlargement 62 of the linkage bar 64 can ordinarily function as a stop, limiting the function of the spring 68 to one of advancing the jaws 28, 30 from the retracted positions of FIGS. 3 and 4 to the intermediate position of FIG. 1.

The ball shoulder 62 on the linkage bar 64 in conjunction with the internal shoulder surfaces of the flanges 36, 38 constitute a one-way driving connection which is involved with the retracting movement of the jaws from their advanced positions. It is seen that the parts of this one-way driving connection are out of engagement or separated from each other for the retracted positions of the jaws illustrated in FIGS. 3 and 4.

The body 18, 20 may be attached to a cooperable supporting structure by any suitable means, as for example by a lug 74 at one end of the body, having a hole 76 to accommodate a bolt or the like.

The operation of the improved fastener device of the invention may now be readily understood. Considering FIG. 1, the user may actuate or shift the operating collar 44 from left to right, as illustrated in FIG. 3, to retract axially the jaws 28, 30 in readiness for receiving the cable and ball enlargement thereof. While holding the jaws in the said retracted position, the user may insert the cable end 14 and ball 16 as illustrated in FIG. 4. The engagement of the ball with the jaws 28, 30 will spread the latter apart, and the cable end and enlargement may be shifted inward beyond the position of FIG. 4, until the enlargement 16 is behind the jaws. The user then releases the collar 44, whereupon the cable and enlargement will be securely gripped and held, as illustrated in FIG. 5. Upon release of the collar 44, the spring 58 which has been compressed as seen in FIGS. 3 and 4, will expand and shift the jaws 28, 30 axially to the left, returning these to the intermediate closed position of FIGS. 1 and 5.

In accordance with the invention, release of the cable 14 and enlargement 16 is intended to be effected in response to an excessive pull or overpull on the cable. Under normal load conditions, the compression spring 70 will remain in its expanded condition, maintaining the jaws closed as shown in FIGS. 1 and 5. However, when a given predetermined excessive load is placed on the cable 14, the latter can shift the jaws 28, 30 axially from right to left, to an advanced position as illustrated in FIG. 6, compressing the spring 70. Due to the disengagement between the backing projections 50, 52 of the jaws and the annular shoulder 54 of the body piece 18, the jaws can now pivotally spread apart or shift generally radially away from each other whereby they will release the enlargement 16. Upon removal of the cable 14 and enlargement 16 from the jaws, the spring 70 will return the latter to the intermediate, closed position as illustrated in FIG. 1. As an alternative procedure, the user may manually release the fastener, by either shifting the collar 44 to the left or to the right from the intermediate position of FIG. 1, depending on the circumstances and conditions. In either case, the jaws 28, 30 will be shifted axially to either the advanced or retracted positions wherein they can spread apart and release the enlargement 16 of the cable end 14.

It will now be seen that I have provided a novel and improved fastener for releasably gripping an enlargement on a cable end or the like, which fastener intentionally releases the cable in response to an overpull or excessive pull on the same. The fastener involves relatively few parts, which may be economically constructed and assembled. Straightforward mechanical principles are involved in the operaiton of the parts, and the construction is rugged and reliable whereby malfunctioning is avoided. The parts are substantially wholly enclosed, providing a neat and finished appearance to the fastener, and the operation of the jaws is easily and quickly effected, by sliding the release collar 44 or other action in the manner explained above. The action of the spring 70 is such that, for all normal loads on the cable which is secured to the fastener, the cable will not be inadvertently released. However, in response to a greatly increased or excessive pull on the cable, the spring 70 will compress and the jaws 28, 30 will be quickly advanced to effect a virtually instantaneous and unfailing release of the cable.

Variations and modifications may be made within the scope of the claims, and portions of the improvement may be used without others.

I claim:

1. A fastener for releasably gripping an enlargement on a cable end, comprising, in combination:
   (a) an elongate body having an axial bore which opens at one end of the body,
   (b) a pair of opposed jaws disposed in said bore and movable axially and rearwardly from a given closed position to a retracted open position,
   (c) advancement means biasing the jaws to shift the same from said retracted open position to said given position,
   (d) means maintaining the jaws closed at said given position,
   (e) said jaws being axially movable forwardly from said given closed position to an advanced open position,
   (f) retraction means biasing the jaws to shift the same from said advanced open position back to said given closed position,
   (g) said jaws being adapted to receive and grip between them a cable-end enlargement which has been pushed into the bore of the body and between the jaws as the latter are spread apart when in their retracted positions, (h) an excess pull on said gripped cable-end enlargement being capable of shifting the jaws to their advanced positions whereby they release the said enlargement.

2. A fastener as in claim 1, wherein:
(a) said retraction means comprises a spring and a one-way driving connection between the spring and the jaws.

3. A fastener as in claim 2, wherein:
(a) the one-way driving connection comprises a linkage between the spring and jaws, and
(b) an abutment on said body, engageable with said linkage to halt movement of the latter when the retracting means has shifted the jaws to said given position.

4. A fastener as in claim 3, wherein:
(a) the abutment on the body comprises a shoulder at the inner end of the bore of body, engageable with an end portion of said linkage.

5. A fastener as in claim 2, wherein:
(a) the one-way driving connection comprises a linkage bar extending between the spring and the jaws,
(b) said bar having a shoulder disposed between the jaws,
(c) said jaws having inwardly-disposed shoulder portions engaged with the shoulder of the linkage bar,
(d) said body preventing the shoulder portions of the jaws from shifting radially outward and away from the axis of the linkage bar, thereby to prevent radial disengagement of said shoulder portions and shoulder.

6. A fastener as in claim 1, and further including:
(a) manually operable means comprising a finger piece movably carried by the body, for manually shifting the jaws axially from the said given position.

7. A fastener as in claim 6, wherein:
(a) the manually operable means can effect an axial shifting of the jaws to either the said retracted or else the said advanced position.

8. A fastener as in claim 1, wherein:
(a) the advancement means and retraction means includes a common stop member disposed in the body and includes compression springs disposed in the body on opposite sides of and engaged with the stop member,
(b) said stop member being affixed to said body.

9. A fastener as in claim 8, wherein:
(a) said retraction means comprises a one-way driving connection between the jaws and one of said springs.

10. A fastener as in claim 9, wherein:
(a) said stop member comprises an annulus,
(b) said one-way driving connection comprising a linkage bar passing through said annullus and compression springs.

11. A fastener as in claim 9, wherein:
(a) the body has a pair of oppositely disposed, longitudinally extending slots adjoining the jaws,
(b) said finger piece comprising a sleeve movable on the exterior of the body, and
(c) pins connected to said sleeve and jaws, for effecting simultaneous axial movements of the same, said pins extending through the longitudinally extending slots.

12. A fastener as in claim 1, wherein:
(a) the jaws have projections at their backs,
(b) said body having internal projections at the mouth of its bore,
(c) said projections of the jaws and body being engageable with each other when the jaws are at said given closed position, to hold the jaws closed.

13. A fastener as in claim 12, wherein:
(a) said projections of the jaws and body having sloped edges whereby the jaws are cammed inward by the projections as the jaws are moved to said given positions.

References Cited

UNITED STATES PATENTS 602,569    4/1898    Turner.
3,171,183    3/1965    Johnston.

BERNARD A. GELAK, *Primary Examiner.*